(12) United States Patent
Helmke et al.

(10) Patent No.: US 7,651,602 B2
(45) Date of Patent: Jan. 26, 2010

(54) ELECTROLYZER

(75) Inventors: Joachim Helmke, Calden (DE);
Hans-Joachim Kohnke, Kassel (DE);
Gabi Balan, Dunmore (CA)

(73) Assignee: Fatpower, Inc. (CA)

( * ) Notice: Subject to any disclaimer, the term of this patent is extended or adjusted under 35 U.S.C. 154(b) by 0 days.

(21) Appl. No.: 11/539,497

(22) Filed: Oct. 6, 2006

(65) Prior Publication Data

US 2007/0119707 A1    May 31, 2007

Related U.S. Application Data

(62) Division of application No. 10/418,472, filed on Apr. 18, 2003, now abandoned.

(30) Foreign Application Priority Data

Aug. 28, 2002 (CA) .................................. 2400775

(51) Int. Cl.
*C25B 15/08* (2006.01)
(52) U.S. Cl. ........................................ 205/412
(58) Field of Classification Search ............ None
See application file for complete search history.

(56) References Cited

U.S. PATENT DOCUMENTS

| | | | |
|---|---|---|---|
| 3,928,078 A | 12/1975 | Koethe et al. | |
| 4,035,554 A | 7/1977 | Halberstadt et al. | |
| 4,221,847 A | 9/1980 | Inmkann | |
| 4,308,322 A | 12/1981 | Hammar | |
| 4,507,367 A | 3/1985 | Ruch et al. | |
| 4,720,331 A | 1/1988 | Billings | |
| 6,001,226 A * | 12/1999 | Freire et al. ............. | 204/255 |
| 6,588,461 B2 | 7/2003 | Morizane | |
| 7,005,075 B2 | 2/2006 | Herrington | |
| 2004/0048115 A1 | 3/2004 | Devos | |

FOREIGN PATENT DOCUMENTS

| | | |
|---|---|---|
| CA | 2130911 | 9/1993 |
| CA | 2174545 | 4/1995 |
| CA | 2376830 | 9/2002 |
| DE | 03902651 A1 | 8/1990 |
| DE | 04131704 A1 | 3/1993 |

OTHER PUBLICATIONS

Perry, R. H.; Green, D.W. (1997) Perry's Chemical Engineers' Handbook (7th Edition), (p. 10-35) McGraw-Hill.

* cited by examiner

*Primary Examiner*—Harry D Wilkins, III
(74) *Attorney, Agent, or Firm*—Colin P. Cahoon; Carstens & Cahoon, LLP (57) ABSTRACT

An electrolysis cell includes an inner chamber containing a stack of porous anode and cathode plates with separators therebetween. Electrolyte is circulated through the porous anodes and cathodes in the inner chamber to generate hydrogen and oxygen gas. A plurality of electrolysis cells can be mounted together to form an electrolyzer unit.

5 Claims, 11 Drawing Sheets

ELECTROLYZER

RELATED APPLICATIONS

This application is a divisional application of pending application U.S. Ser. No. 10/418,472, filed on Apr. 18, 2003, now abandoned entitled "Electrolyzer".

FIELD OF THE INVENTION

The present invention relates to an electrolyzer and, in particular, an electrolyzer for producing hydrogen gas from water.

BACKGROUND OF THE INVENTION

Electrolyzers for producing hydrogen gas from water, generally in the form of an electrolyte solution, are known. Such electrolyzers are particularly useful for producing hydrogen and oxygen gases in a vehicle, the gases being used to supplement and enhance the fuel supply to the vehicle's engine.

Previous electrolyzers for on-board vehicle use had various drawbacks. The electrolyzers were archaic, large and heavy, utilizing technology that had been in place for a number of years such as stainless steel plates and open containers. In addition, the electrolyte often became polluted by metal ions that came off the plates and often ran low. These issues had safety consequences and resulted in a lack of efficiency and reliability in the unit.

Many previous cells generated hydrogen gas and oxygen together without separating the gases. Thus, since these gases together are extremely explosive, many safety components had to be incorporated in any electrolyzer system. This increased complexity of many previous systems and, thereby, their cost and chance of failure.

SUMMARY OF THE INVENTION

An electrolysis cell has been invented that allows an increase in power density, and a reduction in size and weight over previous electrolyzer cells. Hydrogen and oxygen, although both generated in the cell, are maintained separate so that concerns over explosion are reduced or eliminated. An electrolyzer unit can include one or more of the electrolysis cells.

In accordance with one aspect of the present invention, there is provided an electrolysis cell for producing hydrogen and oxygen from a concentrated liquid electrolyte, the cell comprising: a housing, a plurality of porous cathode plates, a plurality of porous anode plates disposed between the cathode plates, a hydrogen gas conduit in fluid flow communication between the cathode plates and a hydrogen gas outlet port on the housing; an oxygen gas conduit in fluid flow communication between the anode plates and an oxygen gas outlet port on the housing, an electrolyte inlet and an electrolyte outlet, the electrolyte inlet and the electrolyte outlet arranged such that electrolyte flows through the anode plates and the cathode plates and a separator disposed between each adjacent anode plate and cathode plate, a separator disposed adjacent each of the electrolyte inlet and the electrolyte outlet, the separators being selected to be permeable to electrolyte and impermeable to hydrogen gas and oxygen gas. In accordance with another aspect of the present invention, there is provided an electrolyzer unit for producing hydrogen and oxygen from a concentrated liquid electrolyte, the unit comprising: a housing; two electrolysis cells within the housing, each electrolysis cell including an inner chamber and disposed therein a plurality of porous cathode plates, a plurality of porous anode plates, the porous cathode plates alternating between the anode plates and a separator disposed between each adjacent anode plate and cathode plate, the separators being selected to be permeable to electrolyte and impermeable to hydrogen gas and oxygen gas bubbles; a hydrogen gas conduit in fluid flow communication with the cathode plates and a hydrogen gas outlet port on the housing; an oxygen gas conduit in fluid flow communication with the anode plates and an oxygen gas outlet port on the housing, a secondary electrolyte inlet and a secondary electrolyte outlet, the secondary electrolyte inlet and the secondary electrolyte outlet arranged such that electrolyte flows through the anode plates and the cathode plates, a separator disposed adjacent each of the secondary electrolyte inlet and the secondary electrolyte outlet; a main electrolyte inlet conduit to supply electrolyte to the cells and extending between the secondary electrolyte inlets of the two electrolysis cells; and a main electrolyte outlet conduit through which electrolyte is evacuated from the cells, the main electrolyte outlet conduit extending between the secondary electrolyte outlets of the two cells; the main electrolyte inlet conduit and the secondary electrolyte inlets together being formed to maintain galvanic separation of at least 95% between the two cells; and the main electrolyte outlet conduit and the secondary electrolyte outlets together being formed to maintain galvanic separation of at least 95% between the two cells.

In accordance with another broad aspect of the present invention there is provided an electrolyzer unit for producing hydrogen and oxygen from a concentrated liquid electrolyte, the unit comprising: a housing; a first electrolysis cell within the housing and a second electrolysis cell within the housing, each electrolysis cell including a plurality of porous cathode plates, a plurality of porous anode plates disposed between the cathode plates, a hydrogen gas conduit in fluid flow communication with the cathode plates and a hydrogen gas outlet port on the housing; an oxygen gas conduit in fluid flow communication with the anode plates and an oxygen gas outlet port on the housing, a first and a second electrolyte inlet and a first and a second electrolyte outlet, the electrolyte inlets and the electrolyte outlets arranged such that electrolyte flows through the anode plates and the cathode plates and a separator disposed between each adjacent anode plate and cathode plate, a separator disposed adjacent each of the electrolyte inlets and the electrolyte outlets, the separators being selected to be permeable to electrolyte and impermeable to hydrogen gas and oxygen gas bubbles; an electrolyte inlet conduit to supply electrolyte to the cells and extending between the electrolyte inlets of the first and the second electrolysis cells; an electrolyte outlet conduit through which electrolyte is evacuated from the cells, the electrolyte outlet conduit extending between the electrolyte outlets of the first and the second electrolysis cells; and an electrolyte diffusion assembly positioned between the first and the second cells and forming a wall therebetween, the electrolyte diffusion assembly defining the first electrolyte inlet and the first electrolyte outlet of the first electrolysis cell and the second electrolyte inlet and the second electrolyte outlet of the second electrolysis cell.

In accordance with another broad aspect of the present invention, there is provided an electrode for use in an electrolysis cell, the electrode comprising: a porous conductor having an outer surface, an active layer material on the outer surface of the porous conductor, a catalyst dispersed within the active layer material, and a contact for electrical connection to a power source, the contact molded into contact with the porous conductor.

DETAILED DESCRIPTION OF THE PRESENT INVENTION

Figure 1:
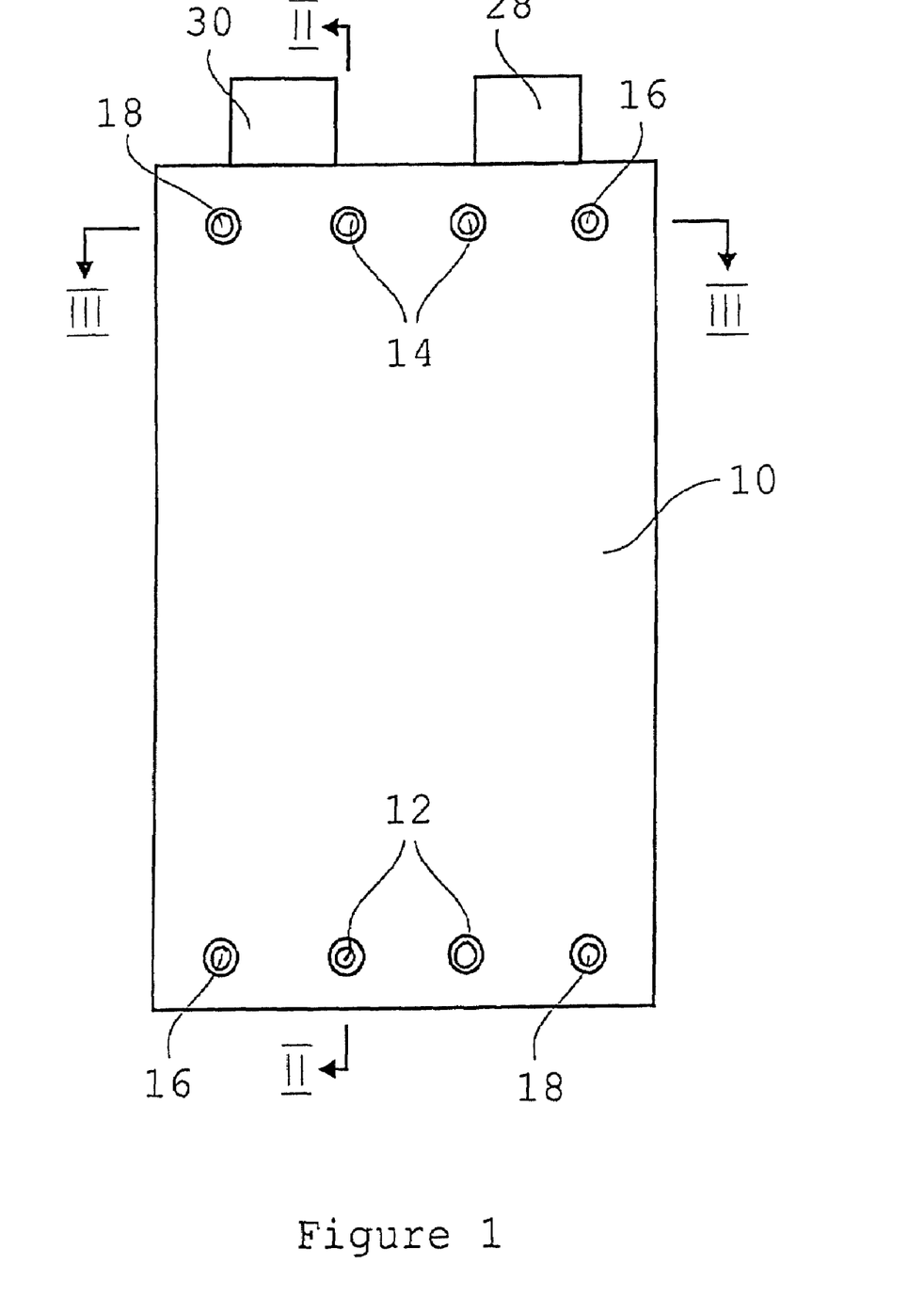
FIG. 1 is an end elevation of an electrolysis cell according to the present invention.
Figure 2:
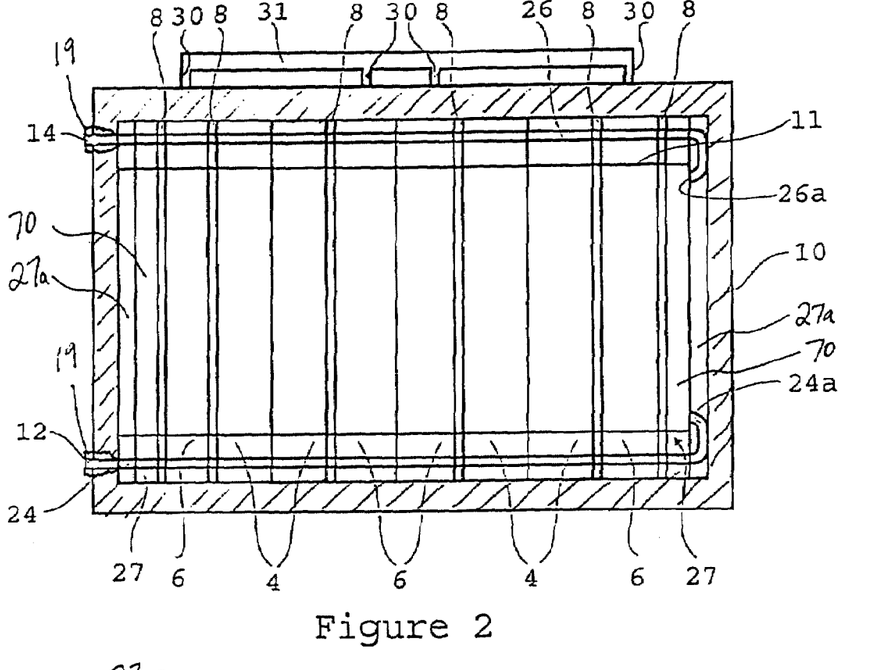
FIG. 2 is a schematic section along line II-II of FIG. 1.
Figure 3:
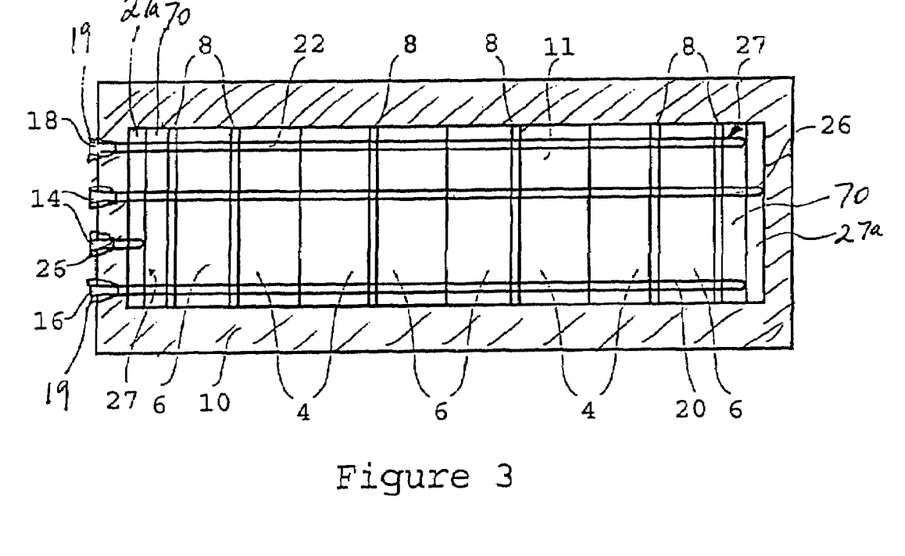
FIG. 3 is a schematic section along line III-III of FIG. 1.

Referring to FIGS. 1 to 3 an electrolysis cell according to the present invention is shown. The cell contains a plurality of anodes 4 and cathodes 6 and operates using a concentrated liquid electrolyte such as 3 to 7 molar potassium hydroxide. The use of highly concentrated electrolyte allows the cell to operate in low temperatures without freezing. Each adjacent anode and cathode has therebetween an electrolyte-permeable, gas-impermeable separator 8. The electrodes and separators are formed as thin plates and arranged in a stack. A separator 8 is also disposed at each end of the stack. The electrolysis cell is illustrated schematically in FIGS. 2 and 3, in that the thickness of each electrode and each separator is overemphasized and out of proportion. Generally, the electrodes and separators are each less than 1 mm thick, while being much larger in plan (i.e. for example 10 to 20 cm wide and 20 to 40 cm long). Thus, the cell is actually much thinner and more compact than that shown in the drawings.

An outer housing 10 is disposed about the stack of anodes 4, cathodes 6 and separators 8. The housing defines an inner chamber 11 in which the anodes, cathodes and separators are disposed. The housing is arranged closely about the electrodes and separators. In particular, in the illustrated embodiment, the cell is formed such that the electrodes and separators are embedded in the material of the housing. This is achieved by arranging the electrodes and separators in a mold and injecting the housing material in liquid form about the arranged parts and allowing the housing to set, as will be more fully described hereinafter.

Housing 10 has a plurality of inlet and outlet ports extending therethrough. In particular, the housing includes inlet ports 12 for electrolyte, outlet ports 14 for electrolyte, outlet ports 16 for generated hydrogen and outlet ports 18 for generated oxygen. Ports 12 to 18 can be tapped or otherwise prepared to receive connectors 19 for connection to fluid lines.

Ports 12, 14, 16 and 18 are in fluid flow communication with conduits extending through the cell. In particular, ports 16 and 18 are in fluid flow communication with hydrogen conduit 20 and oxygen conduit 22, respectively, and ports 12 and 14 are in communication with electrolyte inlet and outlet conduits 24, 26, respectively. Each of the electrolyte conduits 24, 26 have openings 24a, 26a to inner chamber 11 where the electrodes and separators are disposed. An electrolyte distribution assembly 27 is disposed at each end of the stack between the conduit openings 24a, 26a and the end separators 8. Electrolyte distribution assembly 27 includes a plate 27a that forms the ends of conduits 24, 26 and defines openings 24a, 26a and a diffusing member 70.

An electrical contact 28, 30 is connected to each anode and cathode, respectively. They extend out through the housing to be accessible for connection to a power source. Preferably, all of the anode contacts 28 are disposed in line on the housing and all of the cathode contacts 30 are disposed in line on the housing and out of line with anode contacts 28. This facilitates connection to the power source. To further facilitate connection to the power supply all contacts of the same type can be molded together to form one unitary contact 31 for all cathodes of the cell and another unitary contact for all anodes. Thus each cell will have only two terminals to connect supply current to eight plates.

During operation of the cell, electrolyte flows through conduits 24, through to inner chamber 11, outlet conduits 26 and out of the cell. The electrolyte flow parameters and specifically the pressure of inlet fluid and the pressure of outlet fluid and the relative positioning of the inlets and outlets of the cell are selected such that at least some of the electrolyte flows through the planes of the electrodes and separators before passing into outlet conduits 26. While two of each electrolyte conduit 24, 26 are shown in the cell, any number of electrolyte inlets and outlets can be used. If one of each inlet and outlet conduit is used, they should be positioned at opposite ends of the cell such that electrolyte must flow though the electrodes when passing from the inlet to the outlet.

Power is applied to contacts 28 and contacts 30 are connected to ground. The transfer of electrical energy through the cell creates oxygen at the anodes 4 and hydrogen at the cathodes 6. The generated gases cannot mix because of the presence of gas-impermeable separators 8 between each adjacent anode and cathode. Conduit 20 is only in fluid flow communication with the cathodes 6 and conduit 22 is only in fluid flow communication with anodes 4. Thus, any gases evolved on the electrodes flow through one of conduits 20, 22 without mixing.

The cell can be manufactured in various ways. However, in one preferred manufacturing process the electrodes and separators are formed with generally similar widths and lengths and the electrodes and separators are stacked in a selected and aligned arrangement with their planes substantially parallel. The stack is then placed in a mould and while being maintained in this stacked configuration in the mould, a liquid form of the housing material is injected about the stack such that, when the liquid solidifies, the stack is cast within the housing material. In particular, the edges of any porous member such as the electrode and diffuser are infiltrated with housing material while the centers of these members remain open and untouched by housing material.

The housing material surrounds the stack and infiltrates the edges of any porous members such as the anodes and cathodes. Thus, the inner chamber will actually be formed inwardly of the edges of the individual plate members, as shown. To prevent the housing material from infiltrating beyond desired limits, sealants can be applied around the edges of the porous members or the edges can be formed to inhibit infiltration thereto. This will be further discussed with respect to FIGS. 5a and 5b. In addition, the elements of the electrolyzer are pressed together and present mechanical barriers of compatible material allowing the liquid to access and fill only desired volumes.

The conduits 20 to 26 can be formed in various ways. In one embodiment, conduits 20 and 22 are made by forming apertures on the electrodes, separators and electrode distribution plates and aligning these apertures when arranging the stack. The liquid housing material is then injected about the stack and is selected to infiltrate about the formed apertures. When the housing material sets, it forms a solid barrier to isolate the selected apertures from the inner chamber of the cell. This will be described in more detail, hereinafter.

For safety, it is useful not to have gases generated in areas where the gases will not be passed to a gas conduit. Of course, if gases are generated between a pair of separators, the gases will be forced to pass into a gas conduit, since bubbles cannot pass through a separator. To avoid having gases generated outside of the separators such as in the electrolyte conduits, the potential difference between any exposed conductive parts such as, for example, pump components, electrodes or fittings, in the electrolyte path outside of the separators should be no greater than 1.2 volts and preferably no greater than 1.4 volts. Potential differences greater than 1.2 volts will generally occur when an anode or both an anode and a cathode are exposed in a conduit. Thus, conduits 24, 26 should have no reactive electrode surfaces exposed therein. Thus, it is preferred that the manufacture process ensures that the reactive electrode surfaces are recessed back from the exposed surfaces of conduits 24, 26 outside of the separators.

The mould is selected such that portions of the contacts 28, 30 extend out from the housing and are accessible for connection to the power source.

The housing material is selected to be thermally stable in conditions ranging from −45 to +100.degree. C., and resistant to the chemical and electrical conditions present in the cell. The housing material must also be useful for molding in liquid form. One useful housing material is epoxy.

Figure 4:
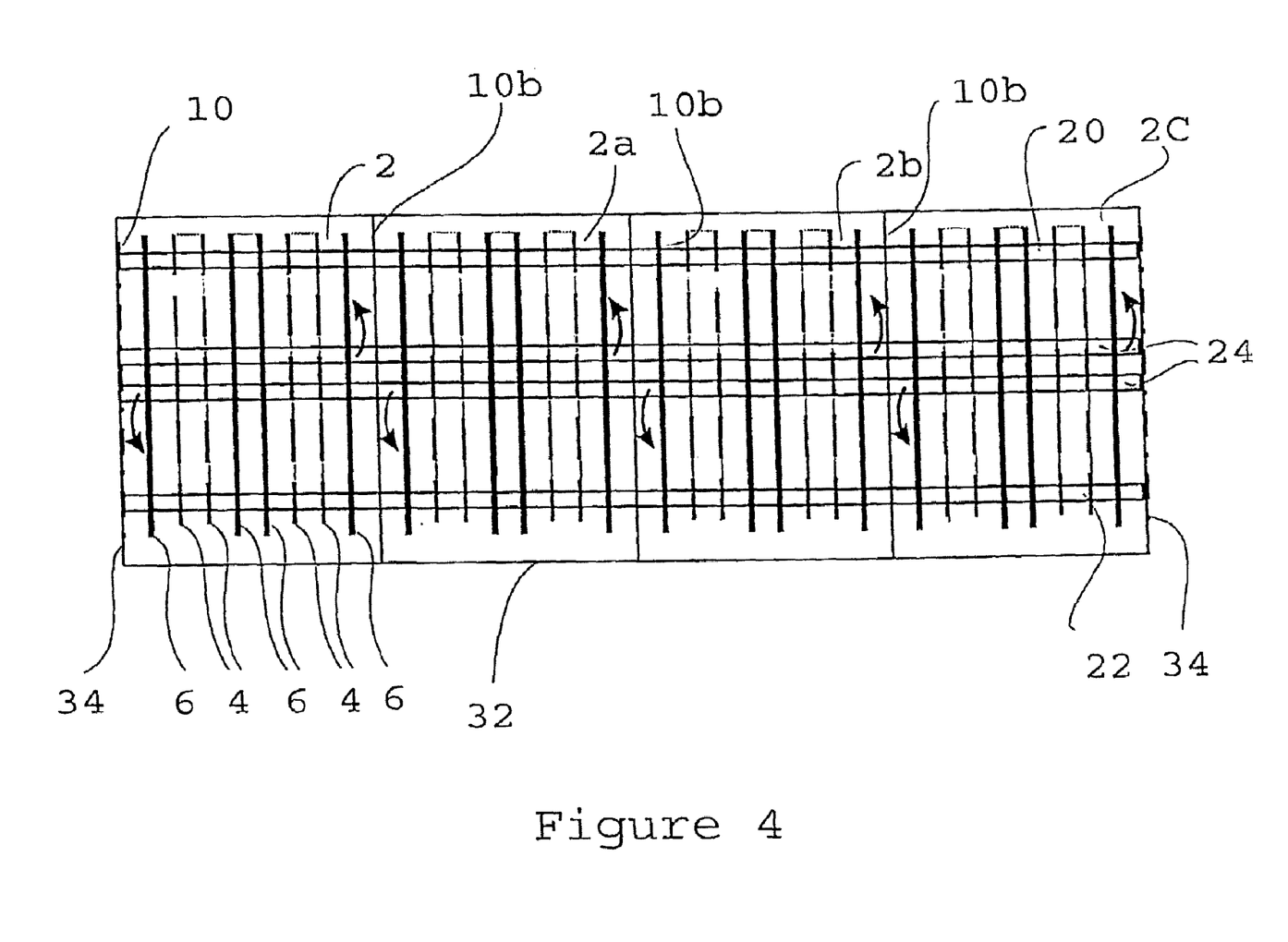
FIG. 4 is a schematic section through an electrolyzer unit according to the present invention, the section being along the electrolyte inlet conduits.

The electrolysis cell shown in FIGS. 1 to 3 is constructed for individual use. However, with reference to FIG. 4, cell 2 with a few modifications can be assembled with other cells 2a, 2b in series to form an electrolyzer unit 32 for providing sufficient generated gases for any particular application. Where a plurality of cells are installed in one unit, electrolyte inlet conduits 24, the electrolyte outlet conduits (cannot be seen in this sectional view) and gas conduits 20, 22 can communicate to each cell in the whole unit. A housing 10 extends around the entire unit and includes internal walls 10b to isolate each cell from its adjacent cells. The electrolyzer unit can be formed in the same way as an individual cell by arranging the stacks of electrodes, cathodes, separators and electrolyte distribution assemblies for each cell in end-to-end configurations with internal walls 10b therebetween and then casting the housing about the stack. To stabilize the overall unit preferably there is an end plate 34 at each end.

Figure 5A:
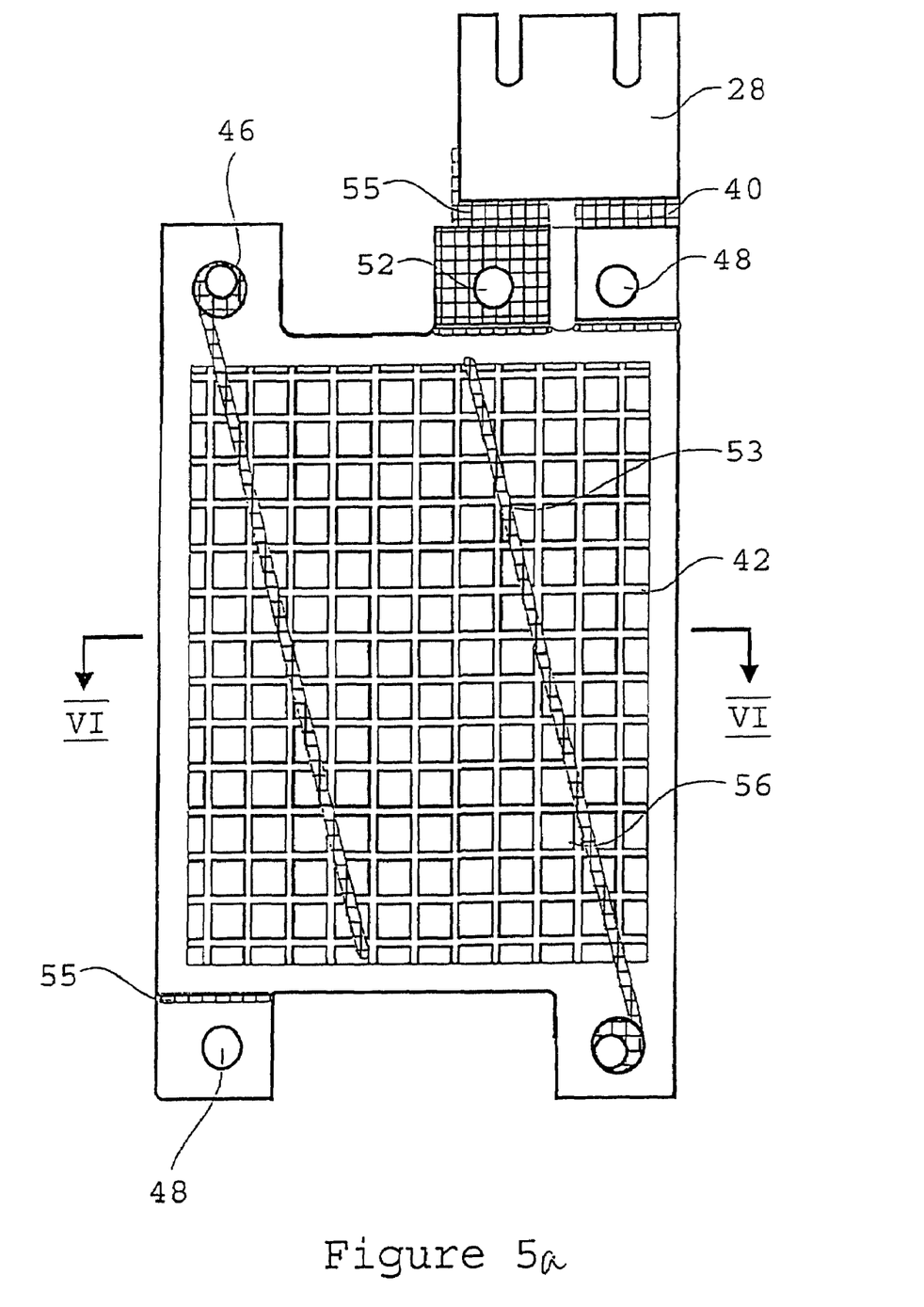
FIG. 5a is a plan view of an anode according to the present invention.
Figure 5B:
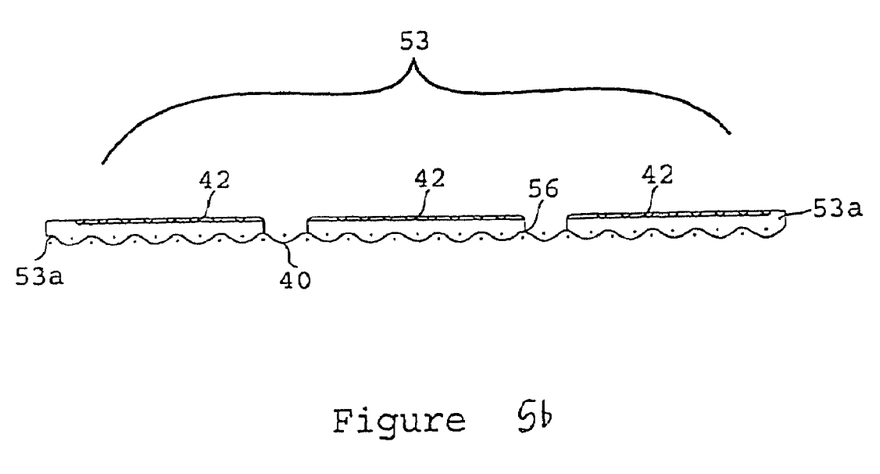
FIG. 5b is a sectional view along line VI-VI of FIG. 5.

Referring to FIGS. 5a and 5b, an anode according to the present invention is shown. The illustrated anode is ready for assembly to form a cell. A useful anode is known as NiH33.™., available from Gaskatel GmbH, Germany. As noted previously, oxygen is produced at the anodes in the present cell. The anode is a gas diffusion electrode including a porous conductor 40 having adhered thereto an active layer 42 including a support containing a catalyst. The catalyst cannot be seen in the drawing as it is finely divided and distributed throughout active layer 42. Conductor 40 is electrically connected to contact 28.

Active layer 42 includes a support including hydrophobic and hydrophilic regions formed of a polytetrafluoraethylene (PTFE) mixture. The support provides the active layer with hydrophobic regions and hydrophilic pores therethrough. Therefore, active layer 42 permits passage of gas through the hydrophobic regions separately from the electrolyte, which passes through the hydrophilic pores. Active layer 42 is pressed into close engagement with the conductor.

The catalyst is the surface at which the electron transfer takes place in the electrolysis reaction. Catalysts such as, for example, nickel, perovskit (LaO.6CaO.4CoO.sub.3), carbon or titanium oxide are suitable for use in the generation of oxygen. In one embodiment, which is preferred on the basis of cost, the catalyst is Raney-nickel. In another embodiment, preferred on the basis of cost and performance, perovskit is used.

Conductor 40 conducts electrons from electrical contact 28 and is porous to permit the flow of a liquid therethrough. Any conductive material can be used that does not break down upon contact with the electrolyte. Nickel or stainless steel is preferred, with nickel being the most preferred material because of its resistance to corrosion. To provide porosity, conductor 40 is preferably formed as a mesh, screen or sponge.

The active layer 42 need be applied only to one side of conductor 40. No benefit is gained by adding active layer to both sides of the electrode. The active layer can be secured to the conductor in various ways. In the illustrated embodiment, the active layer is secured by pressing into engagement with the conductor, as shown by the cross lines.

Contact 28 can be made of any conductive material such as tin, nickel or copper. The electrical connection can be made by welding or, preferably, molding the contact on to an edge of the porous conductor. Molding is done by dipping the conductor into molten contact material, which is preferably contained in a mold. Molding is preferred over welding as it reduces the effects of charge concentration between conductor 40 and contact 28. Tin is the preferred contact material for use where the contact is molded to the conductor.

As will be appreciated, when the anode is molded into a housing, there will be a central reaction area 53 that is open for gas generation and the edges 53a will be embedded into the material of the housing and not open for gas generation. Active layer 42 can be applied to area 53 only or it can be applied to the entire conductor surface, even though a portion of its surface will be embedded in the material of the housing and therefore not functioning.

Since the anode is porous, in constructing the cell using the preferred process, the liquid housing material, for example epoxy, could migrate into the center of the anode, for example into area 53. However, the molding parameters of temperature, time, and pressure are selected with consideration as to active layer 42 to inhibit the migration of liquid housing material beyond the perimeter of area 53, into other areas of the electrode where material migration is not desired.

Anode 4 has apertures 46 formed therethrough which, when aligned with similar apertures on the other electrodes, separators etc., define the oxygen conduits 22. Similarly, apertures 48 define hydrogen gas conduits 20 and aperture 52 defines one of the electrolyte outlet conduits 26. While in the final cell, apertures 46 will be open to the center reaction area 53 of the anode, a gas and liquid impermeable block such as the housing material will be provided about apertures 48, 52 on the anode so that the conduits 20, 26 will be isolated from gases evolved on the anode. To facilitate migration of housing material between reaction area 53 and the apertures 48, 52, the active layer 42 is removed from the conductor to form channels 55 so that housing material can be easily injected thereto. Sealant, such as active layer material can be applied to control the injection of housing material about the apertures. While aperature 52 need not be present for the proper formation of the electrolyte conduit, it is necessary for effective current transfer through the conduit that the conductor have maximum contact with contact 28. Thus, it is desireable to extend the conductor upwardly through the position of one of the conduits 26 and to cut out an aperature 52 for the electrolyte conduit. The conductor can be extended even wider to reduce charge concentration, if desired. However as noted previously, preferably no electrode reaction surfaces are exposed in the final electrolyte conduits so that no gases will be formed therein. Thus, while the conductor need be present about aperature, preferably, there is no active layer 42 about aperature 52. Preferably also there is no conductor open in the conduit. Thus, the aperature has a diameter greater than the desired final diameter of the conduit and the aperture is lined with housing material, as by allowing the housing material during molding to migrate into the aperature and then drilling out the conduit along the center axis of the aperature, without drilling through the conductor.

Oxygen gas that is evolved on area 53 of the anode will pass through a network created by the hydrophobic regions of PTFE active layer 42 and will migrate to oxygen aperture 46 by the pressure of the generated gases. To facilitate evacuation of evolved gases, one or more gas passageways 56 are formed on the anode through active layer 42 to create an open path to apertures 46. The gas passageway is an opening in the Active layer 42 and is formed by either removing the catalyst-containing active layer from the conductor at that area or by avoiding that area during application of the active layer.

Gas passageways 56 reduce the flow resistance of oxygen gas to apertures 46 and, therefore, should be positioned to reduce the length of the flow path to passageway 56 from any point on the gas generation surface. In one embodiment, the gas passageways extend along the edges of area 53 and in another embodiment, they extend more centrally through the gas generation area, for example diagonally inwardly from apertures 46.

Hydrogen gas is evolved at cathodes 6. The preferred cathode is generally similar to the anode, as described with respect to FIGS. 5a and 5b. While similar conductors, catalysts and supports can be used; materials can be selected without worrying overmuch about oxidation issues. Thus, preferably a better conductor such as a copper mesh can be used. In addition, as will be readily appreciated, the reaction area of the cathode is in fluid communication with hydrogen gas apertures 48 and conduit 20 and access to oxygen gas apertures 46 is sealed off, as by injection of housing material thereabout.

Figure 6A:
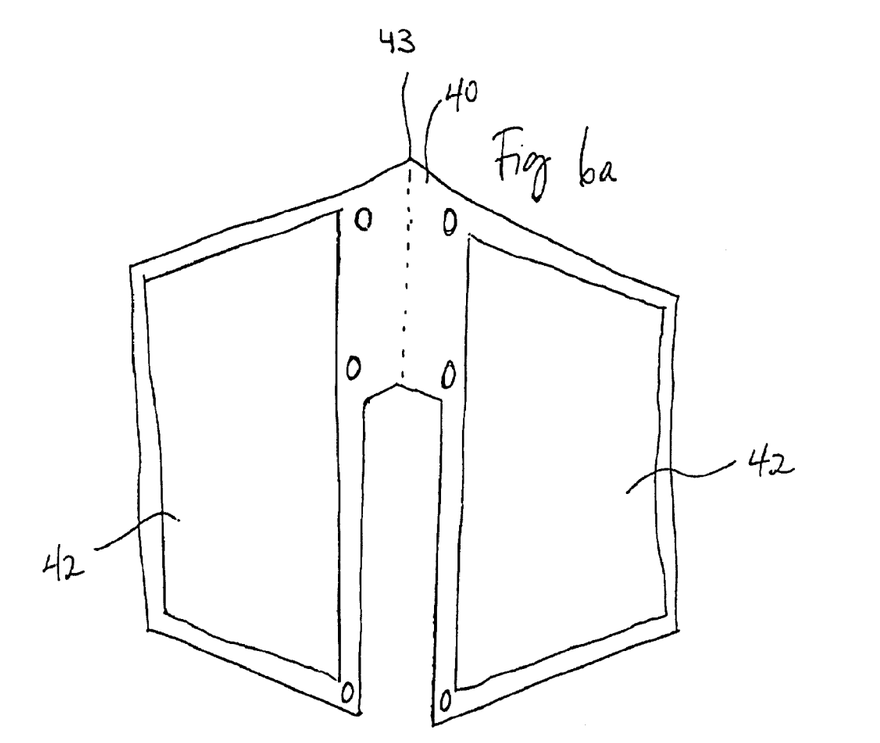
FIG. 6a is a perspective view of a folded electrode useful in the present invention.
Figure 6B:
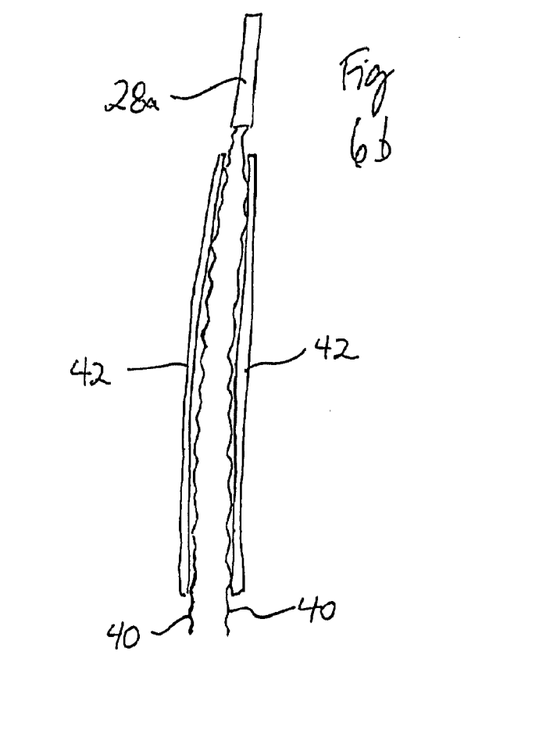
FIG. 6b is a side elevation of a folded electrode useful in the present invention.

Referring to FIGS. 6a and 6b, to facilitate manufacture and assembly of the electrodes, the contacts of two adjacent electrodes of the same type can be formed as one unitary member. The unitary contact is connected between two electrodes and folded to permit the electrodes to be disposed in side-by-side relation with the contact at the edge of each. In one embodiment, the adjacent electrodes are formed from one piece of conductor 40 which has been folded to create a folded edge 43 and two electrode plates on either side thereof. Active layer 42 is applied to the reactive face of each electrode plate. The contact 28a is formed along folded edge 43. Contact 28a can be formed by dipping the folded edge of the conductor material into molten contact material.

Separators 8 are provided between each adjacent anode and cathode and at the ends of each stack of electrodes. The separators are non-electrically conductive and maintain the generated hydrogen and oxygen separate while permitting the electrolyte to pass therethrough. The separators have passages formed and sized to allow the electrolyte ions and water molecules to pass but to exclude the passage of oxygen or hydrogen gas bubbles. Generally, the passages tend to be what and have a diameter of less than 1 micrometer and preferably between about 0.03 and 0.05 micrometer. The separators must be thick enough to avoid the creation of shortcuts between electrodes. However, increasing the thickness of the separator increases the effective distance between electrodes resulting in lower efficiency. Preferably, the separators are about 0.4 mm thick.

Separators 8 are preferably formed of microporous, hydrophilic plastic such as, for example, polypropylene or polyethylene, which are chemically stable in electrolyte and thermally stable in temperatures ranging from $-45$ to $+100.$degree. C. Asbestos can also be used, but is not preferred because of the health and environmental concerns with respect to its processing.

As noted previously, electrolyte is made to flow through the cell and at least some passes through the planes of electrodes 4, 6 and separators 8. This flow of electrolyte reduces gas blinding by enhancing movement of bubbles toward the gas outlets, refreshes the electrolyte about the electrodes and enhances cooling.

The electrolyte flows from inlet openings 24a to outlet openings 26a. For proper operation, at least some electrolyte must flow through the entire cell. While the cell can operate with one or more inlet and one or more outlet, preferably there are two spaced apart inlets and two spaced apart outlets. Since there can be considerable amounts of heat generated in the system, preferably the outlets are positioned to evacuate heated electrolyte without transferring the heat throughout the entire cell. Thus, preferably the outlet ports are disposed adjacent the upper end, with respect to gravity, of the cell. In addition, to facilitate filling the cell with electrolyte, so that no air pockets are present, the outlets are preferably positioned as close as possible to the upper limits of the inner chamber. The inlets and outlets open on the sides of the chamber so that flow is directed through the plane, rather than parallel to the plane, of the electrodes.

Figure 7:
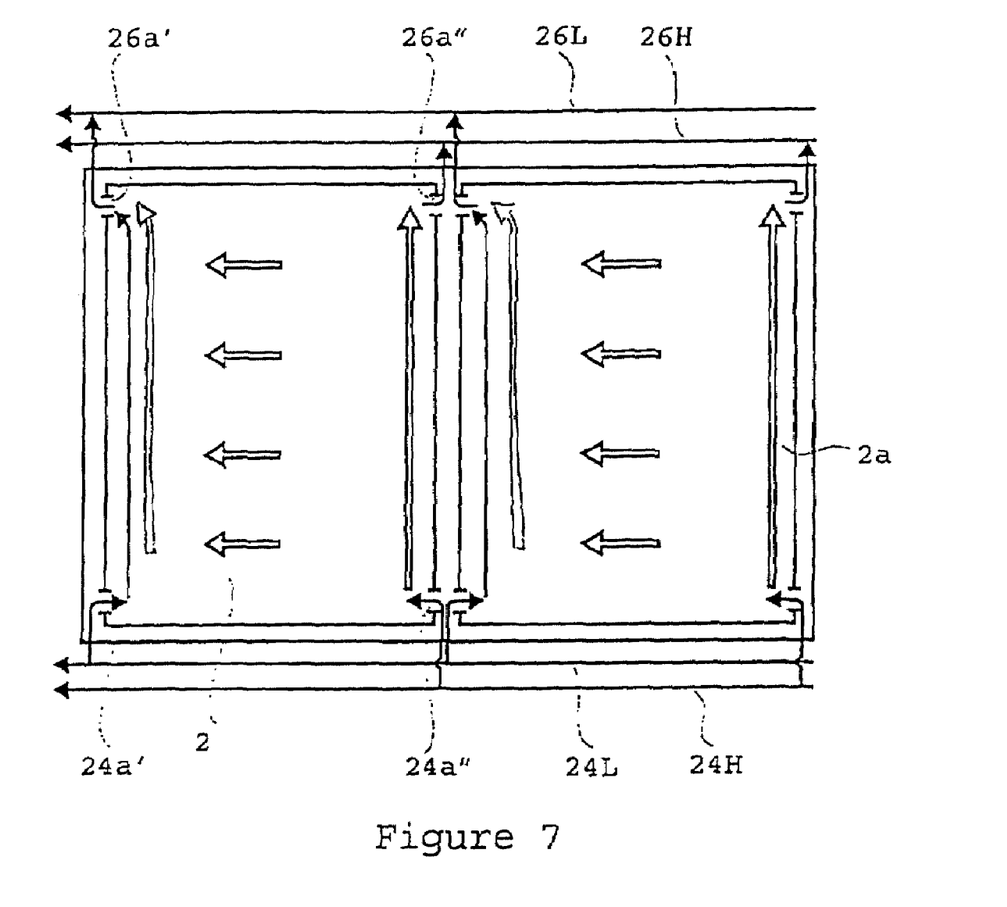
FIG. 7 is a schematic sectional view through a cell showing electrolyte flow.

In order to achieve a flow of electrolyte through the cell, a pressure differential can be established between the inlets and the outlets. In addition, to optimize flow within the cell, there can be a pressure differential established between the two inlets 24a such that there is a cross-cell flow of electrolyte. A pressure differential, albeit less than that at the inlets, will also occur at the outlets. This is explained with reference to FIG. 7, wherein the two inlets of cell 2 are identified as 24a' and 24a" and the two outlets are identified as 26a' and 26a". Flow of each electrolyte entering though inlet 24a' is indicated by solid arrows, while flow entering through inlet 24a" is indicated by outlined arrows.

Because of the resistance to electrolyte flow generated by the electrodes and separators, a major portion of the electrolyte entering through the inlet 24a" will pass adjacent the first separator and exit through outlet 26a" and a major portion of the electrolyte entering through inlet 26a' will pass out through outlet 26a'. This electrolyte flow on either side of the stack of electrodes will provide cooling. However, by diffusion and by supplying the flow of electrolyte through inlet 24a" at a greater pressure than that through inlet 24a', an amount of electrolyte flows from the inlet 24a" to outlet 26a'. Thus, electrolyte flows efficiently through all regions of the inner chamber of the cell to act against gas blinding and to refresh the electrolyte about the electrodes. The pressure differential at the inlets can be established in any desired way, as by pressure regulators or by spacing the inlets along the electrolyte inlet conduit and differential sizing of the inlet and outlet conduits. Preferably the difference between the highest-pressure inlet (24a" in FIG. 7) and the lowest-pressure outlet (26a' in FIG. 7) should be maintained at about 200 to 300 mBar.

To facilitate providing a pressure differential between inlets and a pressure differential between outlets at a plurality of cells 2, 2a, etc., preferably, there are two conduits 24L, 24H for supplying electrolyte and two conduits 26L, 26H through which electrolyte is evacuated from the cell. The pressure of electrolyte supplied through conduit 24L is at a lower pressure than electrolyte supplied through conduit 24H and likewise the pressure generated at the opening to conduit 26L is lower than the pressure generated in the electrolyte at the opening to conduit 26H.

The openings 24a, 26a of the electrolyte conduits are preferably formed in such a way that flow therethrough is diffused and spread over a large surface area. In particular, preferably the openings 24a, 26a are elongate extending at least ⅔ the width of inner chamber 11 and positioned adjacent the bottom and tops of the inner chamber, respectively.

An electrolyte distribution assembly 27 is disposed at the end of each cell 2. Each assembly 27 can be formed in various ways and with various parts depending on the desired structure of the cell and the number of cells that are installed together in one electrolyzer unit. In any event, each electrolyte distribution assembly includes a diffusing member 70 positioned adjacent openings 24a, for effectively diffusing and homogenizing the electrolyte entering the cell.

In one embodiment, the diffusing member includes a plurality of tortuous flow passages. The diffusing member is formed of materials such as stainless steel, nickel or polymeric materials that are resistant to degradation in the conditions of the cell. In a preferred embodiment, the diffusing member is a stainless steel, pressed sponge. The sponge is about 2.5 mm thick before rolling and about 0.8 mm after rolling. A suitable diffusing member is for example, available from Gaskatel GmbH, Germany.

The diffusing member can be mounted in a frame or used on its own. In one embodiment, the diffusing member is molded directly into the housing by arranging at the end of the stack of electrodes and separators prior to injection of the housing material. When the diffusing member is mounted into the cell by molding into the housing, a sealant material, such as a line of polypropylene, must be applied around the perimeter of the diffusing member to prevent epoxy infiltration. The line of polypropylene seals the passages through the diffusing member and act like an o-ring wherein it compresses against adjacent solid surfaces to form a seal therebetween.

Figure 8:
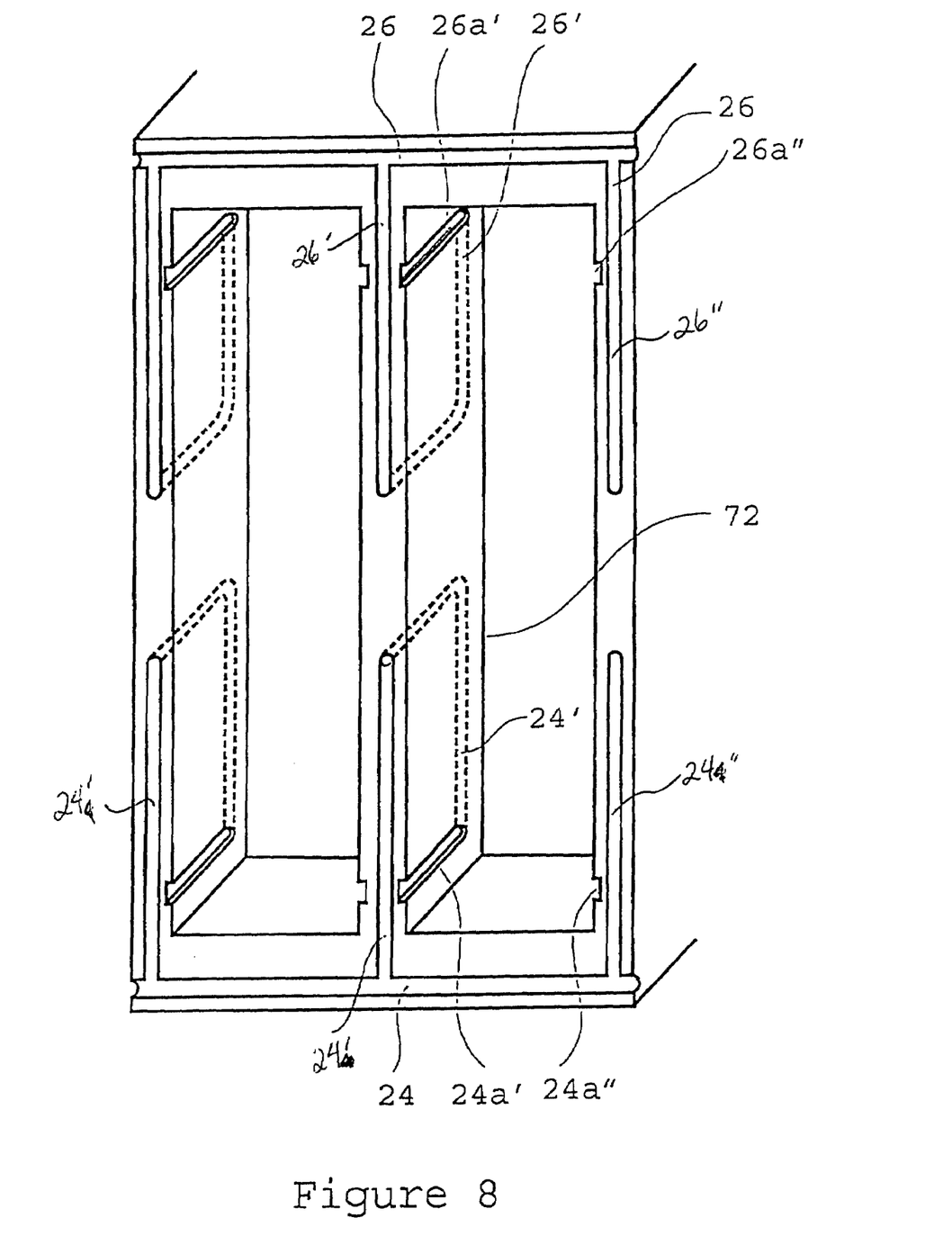
FIG. 8 is a sectional view through an electrolyzer with the components within the cell removed.

In the embodiment illustrated in FIG. 8, two cells are arranged in end-to-end configuration in an electrolyzer unit. In the illustrated unit, the electrodes, separators and diffusing members have been removed to facilitate understanding.

In that embodiment, the electrolyte distribution assemblies house electrolyte inlet conduits 24' and electrolyte outlet conduits 26'. These conduits 24', 26' connect to the main conduits 24, 26, respectively, extending through the cell. Where more than one cell is installed in an electrolyzer unit, the electrolyte conduits can be formed, as shown, to provide the necessary galvanic separation between the cells for example of about 95%. It will be appreciated that for proper functioning of adjacent cells, in one electrolyzer unit, the ohmic loss between the anode and cathode in one cell must be smaller that the ohmic loss between any two cells in an electrolyzer unit. Sufficient galvanic separation between the cells can be provided by forming the entire conduit between adjacent cells including for example the length of conduit 24', conduit 24" and conduit 24 therebetween, to be at least 20 times and preferably 100 times greater than the distance between adjacent electrodes in one cell. In the presently preferred cell, the distance between electrodes is up to about 1 mm and, thus, the run of conduits between cells is 20 mm in length or more. In one embodiment, this desired length is achieved by forming the outlet and/or inlet conduits 24', 26' as labyrinths (shown in phantom), having at least one bend therein to produce an elongate flow path. The conduits should be formed to provide galvanic separation without overly restricting flow or creating hydraulic loss. In particular, their cross sectional area, the number of sharp turns and the surface smoothness should be selected to reduce the size of pump required to circulate the electrolyte and to keep the pressure of the electrolyte at a minimum, while maintaining galvanic separation.

Figure 9:
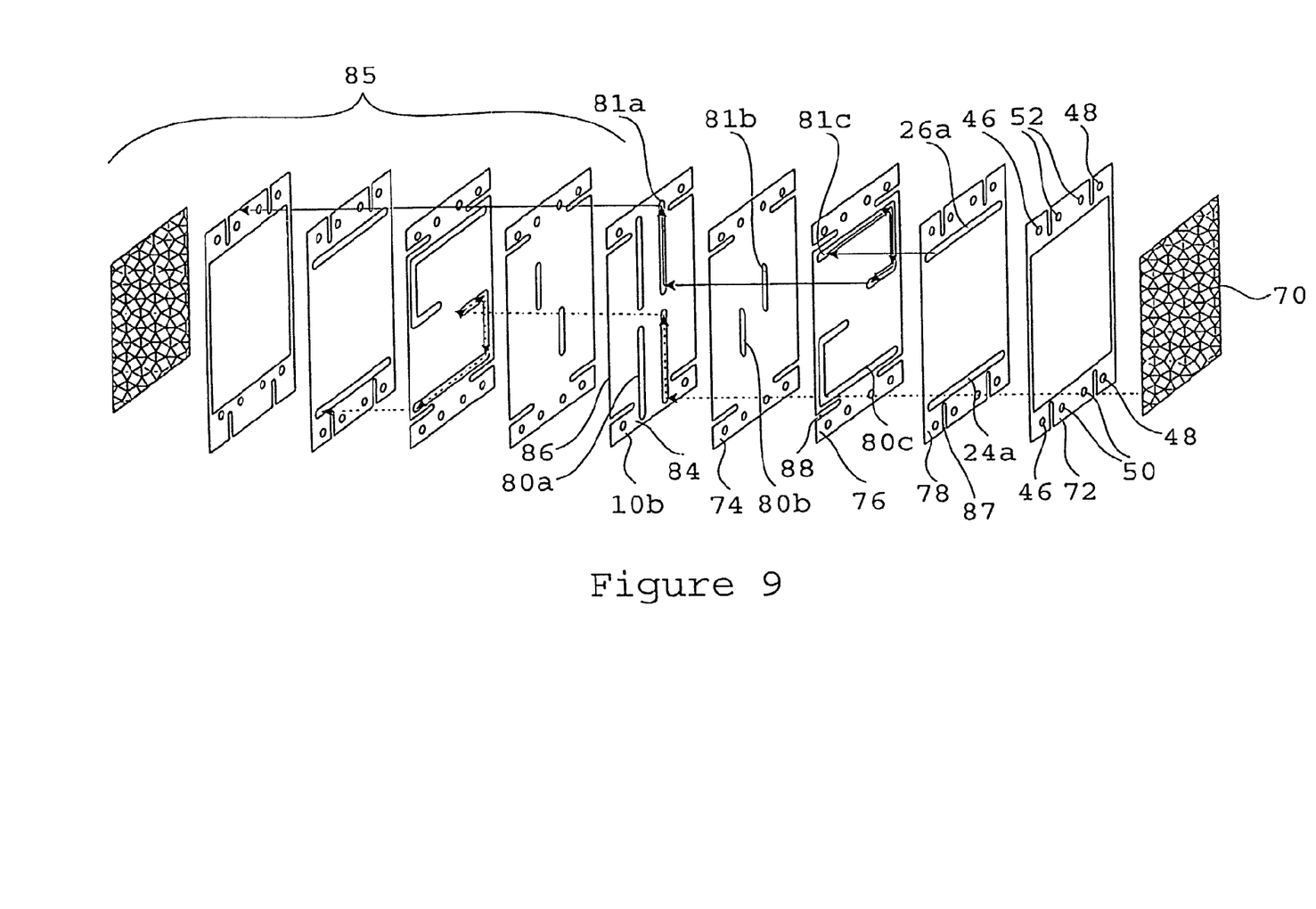
FIG. 9 is an exploded view of an electrolyte distribution assembly useful in the present invention.

For ease of manufacture, the electrolyte inlets and outlets of two adjacent cells 2, 2a can be formed in one assembly, while maintaining cell isolation. Referring to FIG. 9, an electrolyte distribution assembly 27a can be formed by adhering a plurality of layers together in a laminate arrangement. Electrolyte distribution assembly 27a includes a center plate 10b, which forms the barrier between adjacent cells and a frame 72 for supporting diffusing member 70. Three plates 74, 76, 78 are disposed between center plate 10b and frame 72. Plates 10b, 74, 76, 78 each have slots, for example, 80a, 80b, 80c, 24a, 81a, 81b, 81c and 26a therethrough and are built up so that the slots align to form labyrinth conduits 24' and 26'. Plates 74, 76, 78 and frame 72 are adhered together and adhered against first side 84 of center plate 10b to form one assembly. Another set of plates, indicated as group 85, similar to 74, 76, 78 and a frame similar to frame 72 are adhered to the opposite side 86 of the center plate to form the conduits for the adjacent cell.

Each plate 10b to 78 and frame 72 includes apertures 46, 48, 50 and 52 which, when the plates and frame are adhered together, align to form portions, respectively, of the oxygen conduit, the hydrogen conduit, two electrolyte inlet conduits (i.e. with reference to FIG. 7, one to supply the high pressure inlets 24a" and one to supply the lower pressure inlet 24a') and two electrolyte outlet conduits (i.e. one to evacuate flow through the higher pressure outlet 26a" and one to evacuate flow from the lower pressure outlet 26a'). Apertures 50, 52 are open to selected ones of the slots 80a, 81a on plate 10b depending on whether the slots form an electrolyte inlet or an electrolyte outlet.

In total, there are four separate conduits on the electrolyte distribution assembly 27a of FIG. 9. These conduits are the one inlet and one outlet for one cell and one inlet and one outlet for an adjacent cell. The slots on the plates are arranged such that there is no flow between any of the conduits 24' and 26' on the assembly and that all flow through each conduit passes through the labyrinth rather than directly from the electrolyte apertures to the inlets 24a, 26a. Exemplary electrolyte flow though two groups of slots is shown by arrows.

Notches 87, 88 are formed in the plates and frame to assist in housing material injection during manufacture of the electrolyzer unit so that barriers are formed around the gas channels.

The plates and frame 72 are formed of a non-conductive material, which is thermally and chemically stable at the cell conditions. A particularly useful polymeric material is polysulphone.

Figure 10:
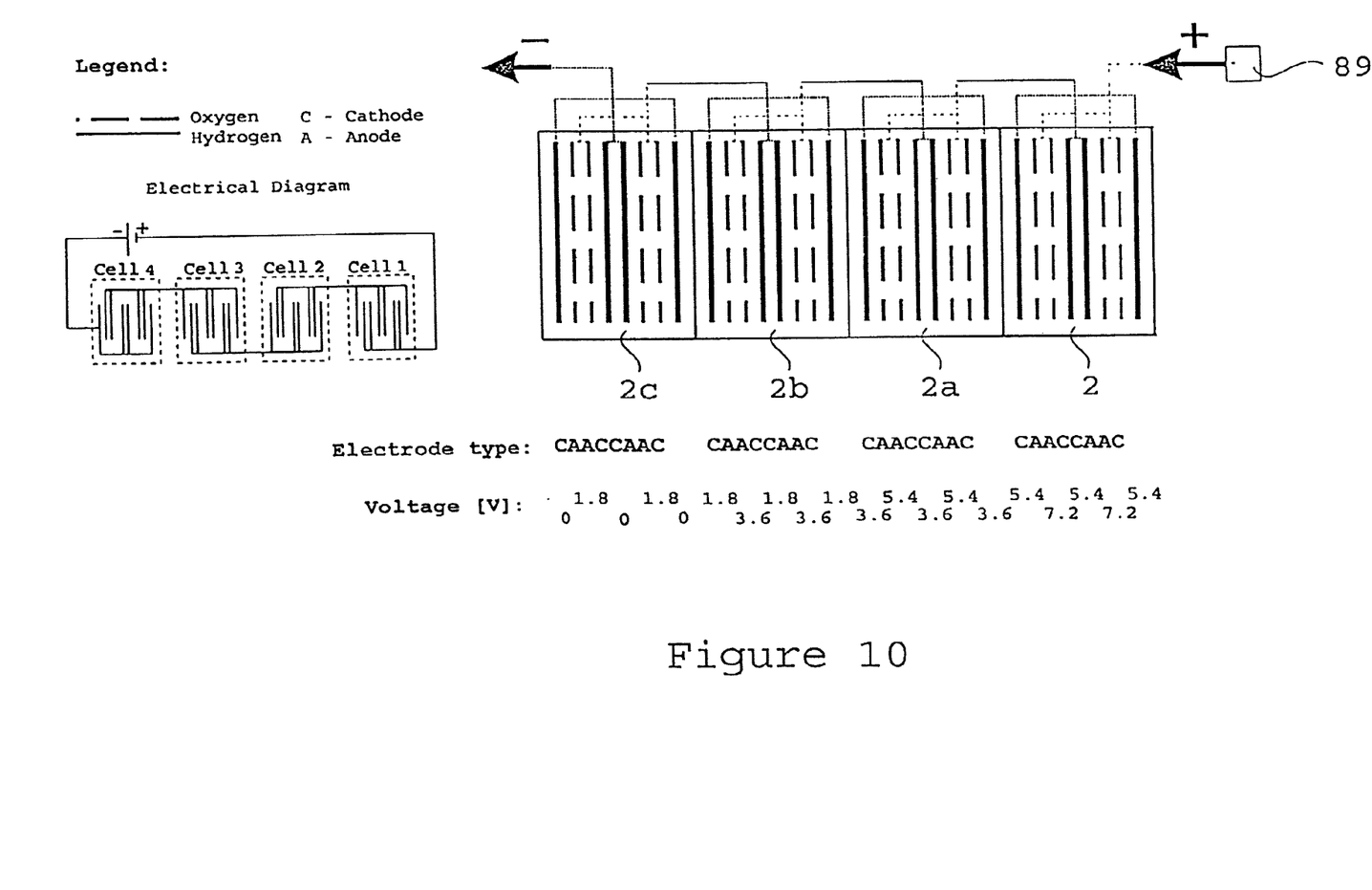
FIG. 10 is a schematic view of an electrolyzer unit showing the electrical connections.

Referring to FIG. 10, when a plurality of cells 2, 2a, 2b, 2c is joined to form an electrolyzer unit 32, preferably the cells are connected in series to a power source 89. When the cell or electrolyzer unit is used in a vehicle, power source 89 is the vehicle battery or alternator and is conditioned by a power regulator (not shown).

A series connection permits the use of a convenient power source. For example, an electrolyzer unit having two to five cells connected in series can be conveniently operated from a car battery or alternator. To simplify the series connection, preferably the electrodes are arranged such that all anode contacts 28 for one cell are lined up on the housing or formed integral and these contacts align with the cathode contacts 30 from the next adjacent cell in the unit.

There can be any number of anodes and cathodes in a particular cell. However, for optimal operation in an vehicle system using a 9 volt power source, preferably each cell contains eight electrodes arranged in a series, as follows: an end cathode, a pair of anodes, a pair of cathodes, a pair of anodes and an end cathode.

Figure 11:
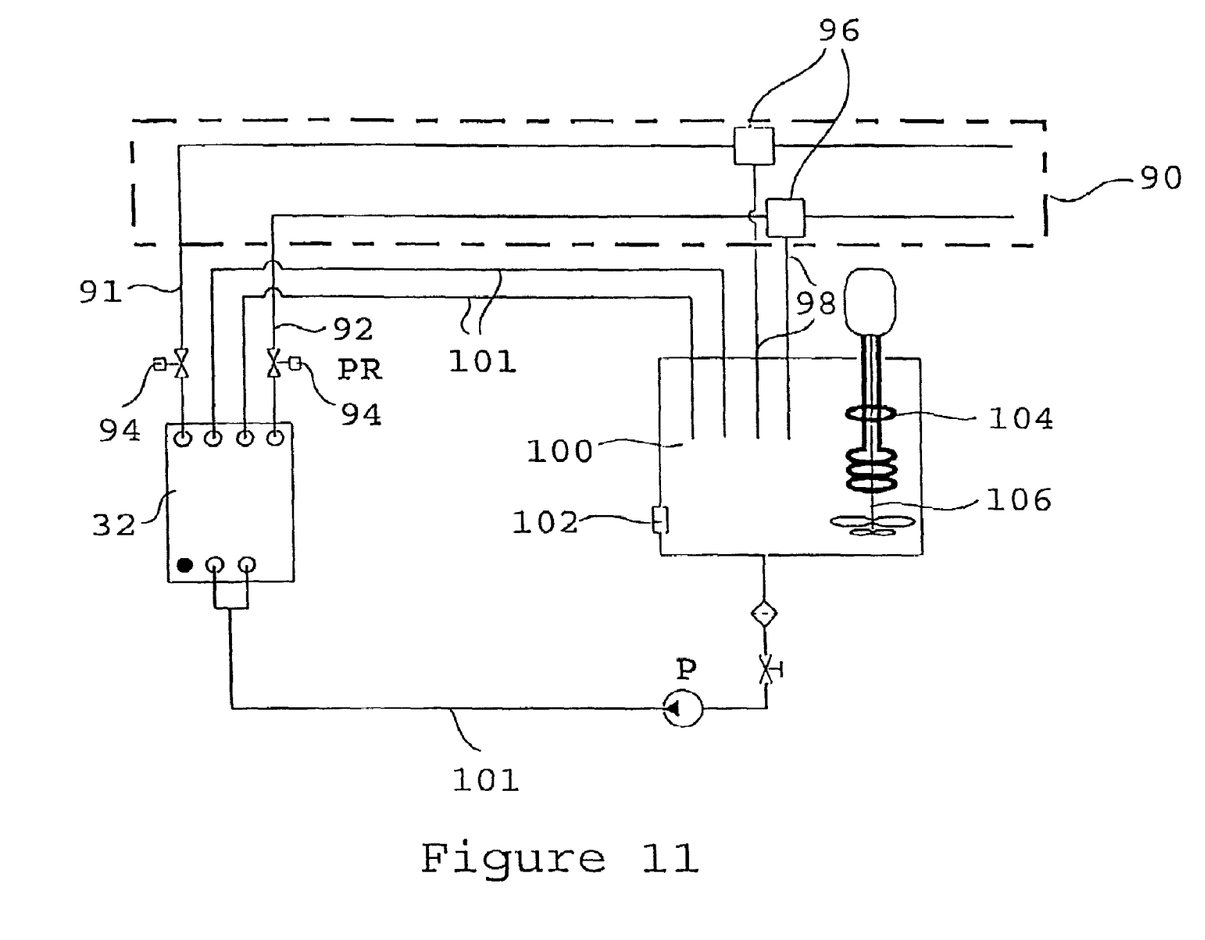
FIG. 11 is a schematic view of the electrolysis unit in a vehicle.

Referring to FIG. 11, gases generated by the electrolysis cell or electrolyzer unit 32 are passed through a gas delivery system 90 to a vehicle engine (not shown) for injection into the engine fuel line, air intake or as an after treatment in the exhaust. Preferably, the generated hydrogen gas and oxygen gas are transported in separate lines 91, 92 and maintained separate until injection to the engine. The gas delivery system includes pressure regulators 94 for each of the hydrogen and oxygen lines. Pressure regulators 94 ensure that the pressure of gas in unit 32 is maintained above a selected pressure that is greater than the pressure of electrolyte in the unit. This prevents the electrolyte from coming out through the gas ports.

The gas delivery system also includes a moisture remover 96 for each line 91, 92. Moisture remover 96 can be chemical-based, using for example silica gel, mechanical, using a Gore-Tex.™ membrane, or electrical, using a Peltier effect condenser. A line 98 extends from each moisture remover to an electrolyte reservoir 100.

Electrolyte flows through a circuit 101 between unit 32 and electrolyte reservoir 100. Reservoir 100 includes controls 102 to ensure that the temperature of the electrolyte is below a selected value of about 80.degree. C. and a level detector 104 to ensure that a suitable volume of electrolyte is available for supplying the unit. A mixer 106 is also provided to ensure that the electrolyte homogeneity is maintained.

It will be apparent that many other changes may be made to the illustrative embodiments, while falling within the scope of the invention and it is intended that all such changes be covered by the claims appended hereto.

The invention claimed is:

1. A method of cooling an electrolysis cell having a plurality of porous electrodes substantially vertically aligned in a stack, the method comprising:
   a. supplying fresh electrolyte to the cell via at least two spaced apart electrolyte inlets including a first electrolyte inlet supplying a major portion of fresh electrolyte from a first end of the stack of porous electrodes, a second electrolyte inlet supplying a first minor portion of the fresh electrolyte from a second opposite end of the stack of porous electrodes, the first minor portion of fresh electrolyte representing the remainder of all of fresh electrolyte being supplied;
   b. collecting spent electrolyte from the cell via at least two spaced apart electrolyte outlets adjacent a top end of the cell, the at least two spaced apart electrolyte outlets including a first electrolyte outlet collecting a major portion of the spent electrolyte from the second opposite end of the stack of porous electrodes, a second electrolyte outlet collecting the remainder of spent electrolyte from the first end of the stack of porous electrodes, the bulk of electrolyte flowing through the cell across the plurality of porous electrodes, the first minor portion of fresh electrolyte being shunted from the second electrolyte inlet to the first electrolyte outlet while removing heat from the cell, and a second minor portion of fresh electrolyte being shunted from the first electrolyte inlet to the second electrolyte outlet while removing heat from the cell, wherein the major portion of fresh electrolyte is greater than the first minor portion of fresh electrolyte.

2. The method claimed in claim 1 wherein at least one separator is employed between at least two porous electrodes, the separator being permeable to electrolyte, the method further comprising:
   a. circulating the first minor portion of fresh electrolyte from the second electrolyte inlet through an outermost electrode at the second end of the cell while being impeded by the at least one separator to flow across the at least one separator to the first electrolyte outlet while removing heat from the cell; and
   b. circulating the second minor portion of fresh electrolyte from the first electrolyte inlet through an outermost electrode at the first end of the cell while being impeded by the at least one separator to flow across the at least one separator to the second electrolyte outlet while removing heat from the cell.

3. The method claimed in claim 1, further comprising:
   a. supplying a larger volume of fresh electrolyte via the first fresh electrolyte inlet than a volume of electrolyte supplied via the second fresh electrolyte inlet; and
   b. collecting a larger volume of spend electrolyte via the first spent electrolyte outlet than a volume of electrolyte collected via the second spent electrolyte outlet.

4. The method claimed in claim 3, wherein the first and second electrolyte inlets have substantially similar diameters, and the first and second electrolyte outlets have substantially similar diameters, the method further comprising:
   a. supplying fresh electrolyte via the first electrolyte outlet at a faster rate than via the second electrolyte outlet.

5. The method claimed in claim 3, wherein the fresh electrolyte is supplied via the inlets at substantially the same rate per unit area, and spent electrolyte is collected via the outlets at substantially the same rate per unit area, the method comprising:
   a. supplying fresh electrolyte via the first electrolyte inlet having a larger diameter than that of the second electrolyte inlet; and
   b. collecting spend electrolyte via the first electrolyte having a larger diameter than that of the second electrolyte outlet.

* * * * *